United States Patent [19]
Wingler et al.

[11] Patent Number: 4,639,473
[45] Date of Patent: Jan. 27, 1987

[54] THERMOPLASTIC MOULDING COMPOSITIONS

[75] Inventors: Frank Wingler, Leverkusen; Otto Koch; Joachim Doering, both of Cologne; Karl-Heinz Ott, Leverkusen; Lothar Liebig, Bergisch Gladbach, all of Fed. Rep. of Germany

[73] Assignee: Bayer Aktiengesellschaft, Leverkusen, Fed. Rep. of Germany

[21] Appl. No.: 801,075

[22] Filed: Nov. 22, 1985

Related U.S. Application Data

[63] Continuation of Ser. No. 568,050, Jan. 4, 1984, abandoned.

[30] Foreign Application Priority Data

Jan. 15, 1983 [DE] Fed. Rep. of Germany ....... 3301161

[51] Int. Cl.$^4$ .............................................. C08L 51/04

[52] U.S. Cl. .......................................... 525/83; 525/74; 525/75; 525/76; 525/77; 525/78; 525/79; 525/84; 525/85; 525/86

[58] Field of Search ....................... 525/75, 83, 85, 86, 525/76, 77, 78, 79, 84, 74

[56] References Cited

U.S. PATENT DOCUMENTS 4,141,934  2/1979  Wingler et al. ..................... 526/342
4,297,446  10/1981  Lindner et al. ...................... 525/83

Primary Examiner—Jacob Ziegler
Attorney, Agent, or Firm—Connolly and Hutz

[57] ABSTRACT

Thermoplastic, high-impact moulding compositions of (A) 5 to 80 parts by weight of a graft product of 70 to 30% by weight of a mixture of an aromatic vinyl compound and acrylonitrile and/or methacrylonitrile on 30 to 70% by weight of a rubber having a glass transition temperature of below −10° as the graft base and (B) 20 to 95 parts by weight of a terpolymer of styrene and/or α-methylstyrene, p-methylstyrene and acrylonitrile and/or methacrylonitrile, the terpolymer having been produced by mass polymerization.

6 Claims, No Drawings

THERMOPLASTIC MOULDING COMPOSITIONS

This is a continuation of application Ser. No. 568,050 filed Jan. 4, 1984, now abandoned.

This invention relates to a thermoplastic, highimpact moulding compositions of (A) from 5 to 80 parts by weight of a graft product of from 70 to 30% by weight of a mixture of
   (a) at least one aromatic vinyl compound and
   (b) acrylonitrile and/or methacrylonitrile on 30 to 70% by weight of a rubber having a glass transition temperature below −10° C. as the graft base and
(B) from 20 to 95 parts by weight of a terpolymer of
   (a) styrene and/or α-methylstyrene,
   (b) p-methylstyrene and
   (c) acrylonitrile and/or methacrylonitrile,
   the terpolymer having been produced by mass polymerization and having the following composition:
   (a) from 20 to 40 parts by weight of styrene and/or α-methylstyrene in a molar ratio of from 0:1 to 1:1,
   (b) from 20 to 50 parts by weight of p-methylstyrene and
   (c) from 10 to 40 parts by weight of acrylonitrile and/or methacrylonitrile,
   the sum total of the parts by weight in (a) to (c) amounting to 100.

Thermoplastic two-phase plastics having heat deflection temperature according to Vicat B of more than 100° C. are known and successfully used in the automotive industry, in the manufacture of domestic articles and in electronic equipment. Moulding compositions of this type consist of a resin which is dimensionally stable under heat ("resin matrix") and in which rubber particles are embedded for high-impact modification. In general, the rubber is compatibilized by graft polymerization of the resin monomers. The dimensionally stable resins used are, preferably, copolymers of styrene with maleic acid anhydride, acrylonitrile or methacrylonitrile and also copolymers of α-methylstyrene with acrylonitrile and optionally styrene. Dimensionally stable resins based on α-methylstyrene are of particular commercial interest.

Conventional techniques for producing the copolymers include emulsion polymerization, bead polymerization mass-bead polymerization and also mass polymerization. Mass polymerization is of particular interest.

Mass polymerization gives higher volume-time yields than emulsion polymerization and, accordingly, is also more economical. Another advantage of mass polymerization is the absence of effluents and drying gases. Mass polymerization makes it possible to produce chemically uniform copolymers of monomers differing in their polymerization reactivity (cf. DE-AS No. 27 24 360).

It has been found that α-methylstyrene can only be radically mass-polymerized extremely slowly, even in the presence of monomers containing nitrile groups, for example acrylonitrile or methacrylonitrile, and that the polymerization reaction involves a high consumption of initiators decomposing into radicals, such as dialkyl peroxides, alkyl hydroperoxides, peresters, perketals and azoinitiators giving products with inadequate molecular weights (weight average below 70,000).

Resins having inadequate average molecular weights also have inadequate strength and cannot be used for the production of high-impact moulding compositions.

Homopolymers and copolymers of p-methylstyrene are known and have higher dimensional stability under heat than styrene polymers. Statistical copolymers of p-methylstyrene with a number of comonomers, such as styrene, α-methylstyrene, acrylates, methacrylates, acrylonitrile, methacrylonitrile, butadiene, isoprene, chloroprene, ethylene and propylene are also known. Graft polymers of vinyl toluenes on rubbers have also been described (cf. U.S. Pat. No. 4,230,836).

The present invention is based on the realization that thermoplastic, nitrile-group-containing moulding compositions based on terpolymers of
(a) α-methylstyrene,
(b) p-methylstyrene and
(c) acrylonitrile and/or methacrylonitrile and
containing graft rubber for high-impact modification are particularly advantageous because they are easy to produce (by mass polymerization) and show high heat deflection temperature, excellent mechanical strength and good processing properties.

The graft products (A) of the moulding compositions according to the invention perferably contain in polymeric form a mixture of:
from 90 to 60% by weight of styrene and/or α-methylstyrene and/or p-methylstyrene and
from 10 to 40% by weight of acrylonitrile and/or methacrylonitrile
as the graft branch and, as the graft base, a butadiene homopolymer or copolymer with 5 to 45% by weight of comonomer in statistical or segmented distribution, or polyisoprene, ethylene/propylene copolymer, ethylene/propylene terpolymer (EPDM), chlorinated polyethylene, ethylene/vinyl acetate copolymer, polypentenamer, ethylene-cyclopentene copolymer, polycyclooctene and homo- and copolymers of $C_2$–$C_8$-alkyl acrylates.

In the terpolymers (B), from 0 to 100% by weight of the styrene in component (a) may be replaced by acrylic acid and methacrylic acid alkyl esters, cyclohexyl esters, phenyl esters and benzyl esters, particularly alkyl esters containing from 1 to 12 carbon atoms in the alcohol component, by (meth)acrylic acid, (meth)acrylic acid amide, N-alkyl-(meth)acrylamide containing from 1 to 8 carbon atoms in the alkyl radical, N-dialkyl(meth)acrylamides containing from 1 to 8 carbon atoms in the alkyl radicals, o-, m-, p-chlorostyrene, o- and p-cyanostyrene, o-, m- and p-methoxy styrene, p-isopropyl styrene and 2,5-dimethoxy styrene.

It is preferred to use methylmethacrylate, methyl acrylate, acrylic acid, methacrylic acid, acrylamide, methacrylamide, N-alkyl-, N-cycloalkyl- or N-arylmaleic imide, maleic acid, fumaric acid, maleic acid anhydride. In the case of maleic acid anhydride, the proportion should not exceed 7.5%. The terpolymers must be chemically uniform, in other words the monomers should be incorporated in all the molecule chains in substantially the same statistical distribution and in equal proportions.

To produce the moulding compositions according to the invention, the grafted rubber may be mixed in the melt in kneaders, internal kneaders, on rolls or in extruders.

The graft products (A) are known and may be obtained by the polymerization of
(a) styrene and/or α-methyl styrene and/or p-methyl styrene and
(b) acrylonitrile and/or methacrylonitrile in the presence of a rubber. This rubber is also known as the graft substrate. In the graft polymerization reaction, the monomers are not completely grafted onto the substrate, instead they polymerize to a certain extent to form a free resin. The graft polymerization reaction may be carried out as such or in emulsion, suspension or solution and by combined processes such as mass/suspension polymerization or solution/precipitation polymerization. Radical-forming initiators are generally used. Emulsion polymerization is preferably used for grafting onto polybutadienes or styrene-butadiene copolymers, whilst solution or solution-precipitation polymerization is preferably used for grafting onto ethylene/vinyl acetate copolymers, ethylene/propylene copolymers and terpolymers. The rubbers should have a glass transition temperature of below −10° C. The graft substrates may be natural rubber or synthetic rubbers in soluble or pre-crosslinked form. Suitable synthetic rubbers are homopolymers and copolymers of conjugated dienes containing from 4 to 8 carbon atoms, such as butadiene, isoprene and their copolymers with styrene and/or acrylonitrile.

The copolymers may have a statistical or block-structure. Where they have a block-like structure, the copolymers may be two-block polymers of the form AB or even 3-block polymers of the form ABA and also star-like block polymers, for example corresponding to the formula $(ABA)_xY$, where A represents styrene for example, B represents butadiene and Y represents the residue of a multifunctional coupling reagent, for example $SiCl_4$, $S_2Cl_2$, divinylbenzene, epoxidized fatty acids; x has a value of from 2 to 5. It is preferred to use polybutadienes with a high cis-content of the double bonds in the polymer chain of more than 55%, the percentage of 1,2-vinyl double bonds amounting to between 1 and 15%, based on the total double bond, content and also styrene-butadiene block copolymers containing from 5 to 45% by weight of styrene. Another class of suitable synthetic rubbers are ethylene-propylene copolymers and terpolymers containing from 70 to 30 parts by weight of ethylene to between 30 and 70 parts by weight of propylene.

It is advantageous to use terpolymers with from 4 to 15% by weight of, for example, 5-ethylidene norbornene, dicyclopentadiene, 1,4-hexadiene and 2,2,1-bicycloheptadiene, containing from about 1 to 20 ethylenically or olefinically unsaturated carbon double bonds per 1,000 atoms. Graft components based on these called EPDM or APTK rubbers are distinguished by their particularly good weather-resistance. Weather-resistant graft substrates also include ethylene-vinyl acetate copolymers (EVA) and acrylate rubbers. The EVA-copolymers contain from 30 to 85% of copolymerized vinyl acetate and, to improve their graftability, may be laterally esterified with unsaturated carboxylic acids, for example acrylic or methacrylic acid. The EVA-copolymers may also be partially hydrolyzed with OH-numbers of from 1 to about 100 mg of KOH/g of substance. The acrylate rubbers are generally polymers of $C_2$–$C_8$-alkyl esters of acrylic acid, for example ethyl, n or iso-propyl, n-butyl, iso-butyl, tert.-butyl, 2-ethylhexyl acrylate. Comonomers include inter alia acrylonitrile, methacrylates containing from 1 to 18 carbon atoms in the ester portion and also $C_2$–$C_{18}$-alkyl vinyl ethers.

To improve graftability, the following comonomers may also be incorporated: dihydrodicyclopentadienyl(meth)-acrylate, vinyl(meth)acrylate, allkyl(meth)acrylate, divinylethylene urea, divinylpropylene urea, triallyl phosphate, triallyl cyanurate, triallyl isocyanurate. Polyfunctional acrylic monomers may be incorporated as crosslinking components in the acrylate elastomers. Polyfunctional acrylic monomers suitable for this purpose are, for example, ethane diol di(meth)acrylate, 1,4-butane diol di(meth)acrylate, 1,6-hexane diol di(meth)acrylate, polyethylene glycol di(meth)acrylate, 3-methylpentane diol di(meth)acrylate, trimethylol propane tri(meth)acrylate, pentaerythritol tri- or tetra-(meth)acrylate, 1,3,5-triacryloyl hexahydro-s-triazine. The acrylate elastomers may also have a core-shell structure or a core-jacket structure, for example they may consist of a soft core surrounded by a hard shell, as described for example in DE-OS No. 30 06 804. Other acrylate substrates are described inter alia in DE-AS Nos. 25 03 996, 28 26 925, 29 01 576, 28 46 754 and 28 28 517.

The terpolymers B of the moulding compositions according to the invention consist of a mass polymer of
(a) α-methyl styrene, optionally in admixture with styrene or another copolymerizable monomer, (20 to 40 parts by weight)
(b) p-methyl styrene (20 to 50 parts by weight)
(c) acrylonitrile and/or methacrylonitrile (10 to 40 parts by weight).

The molecular weight distribution should be as narrow as possible, i.e. between U−0.5 and 1.6, as calculated from $U=(Mn/Mw)-1$. The intrinsic viscosities are in the range from 0.4 to 1.1 dl/g, as measured in dimethyl formamide at 25° C. The resins have a Vicat softening temperature in the range of from 110° to 130° C. They may be produced by continuous mass polymerization, optionally in the presence of a solvent, for example methylethyl ketone or ethylbenzene, for example in accordance with DE-AS No. 27 24 360. The moulding composition may be produced by mixing the graft polymer with the terpolymer, for example on mixing rolls, in kneaders, internal mixers and mixing extruders.

The moulding compositions may contain standard stabilizers, light stabilizers, antiagers, levelling and processing aids, fillers, mineral and organic fillers and reinforcing fibers, such as glass fibers, carbon fibers, metal whiskers, polyester, polyamide and polyaramide fibers and pigments. The moulding compositions are distinguished by high dimensional stability under heat, improved processability and a long flow path in the case of injection moulding.

The moulding compositions according to the invention may be used with particular advantage for applications requiring high weather resistance, high dimensional stability under heat, extreme toughness and easy processibility. For example, they may be used with advantage for the production of pipes, high quality seals, tableware, steam-sterilizable instruments, washing machine components, battery casings, dry battery casings, housings and other insulating components in electrically powered machines, electrical insulating films, hydrolysis-stable container linings, chemically resistant and heat-stable filter cloths.

Preferred applications include the manufacture of vehicle components, the building of automobiles, motor cycles, aircraft and railway vehicles, the manufacture of complicated injection mouldings which are required to show high heat deflection temperature, for example radiator grills, mudguard linings, interior linings, instrument panels, grab handles, car roofs, covers, housings for domestic appliances and office machines.

The invention is illustrated but in no way limited by the following Examples in which the parts and percentages quoted respectively represent parts by weight and percentages by weight.

PRODUCTION OF THE TERPOLYMER

In an unjacketed vessel equipment with an internal thermometer, a stirrer, an inlet and an outlet, 1000 parts of a monomer mixture having the composition indicated in Table 1 are heated to 130° C. A monomer stream having the same composition is then run and, at the same time, the same quantity of polymer solution removed from the vessel in such a way that the residence time in the vessel is 90 minutes and the filling level is maintained. Approximately 0.01 mole percent of azo-bis-isobutyronitrile is continuously added to the inflowing monomer stream. After about 6 hours, the conversion has settled at a constant level of around 45%. 0.1% by weight of 2,6-di-t-butyl-p-cresol is added to the polymer solution which is then freed from monomers and volatile constituents in an evaporation extruder.

PRODUCTION OF MOULDING COMPOSITIONS

To produce the moulding compositions according to the invention, the resin component and the graft copolymers are mixed in conventional processing machines, such as extruders, mixing rolls and kneaders, at temperatures of from 170° C. to 230° C. The moulding compositions of the Examples are made up of 77.5 parts of the resin matrix A and 22.5 parts of a graft rubber B produced by grafting 50 parts of styrene and acrylonitrile in a ratio of 72:28 onto 50 parts of an emulsion-polymerized polybutadiene, the graft substrate having an average particle diameter of from 0.1 to 0.4 μm.

TABLE 1

| No. | ST | PMS | AMS | AN | MSA | Conversion | Remarks |
|---|---|---|---|---|---|---|---|
| 1 | — | 40 | 30 | 30 | — | 52 | — |
| 2 | — | 35 | 30 | 35 | — | 40 | — |
| 3 | — | 30 | 40 | 30 | — | 43 | — |
| 4 | — | 35 | 35 | 30 | — | 45 | — |
| 5 | — | 32 | 30 | 35 | 3 | 42 | — |
| Comparison Resins | | | | | | | |
| 6 | 30 | — | 40 | 30 | — | 40 | mass resin |
| 7 | — | 40 | 30 | 30 | — | — | emulsion resin |
| 8 | 35 | — | 37 | 28 | — | — | emulsion resin |

ST styrene
PMS p-methylstyrene
AMS α-methylstyrene
AN acrylonitrile
MSA maleic acid anhydride

| | $a_n[kJ/m^2]$ | | $a_k[kJ/m^2]$ | | Vic. B | MFI |
|---|---|---|---|---|---|---|
| No. | 20° C. | −40° C. | 20° C. | −40° C. | [°C.] | [g/10 min.] |
| EXAMPLES | | | | | | |
| 1 | $(115)_2$ | 70 | 11.7 | 4.5 | 112 | 12.4 |
| 2 | $(97)_5$ | 54 | 12.1 | 4.4 | 111 | 9.1 |
| 3 | $(110)_8$ | 65 | 10.7 | 3.9 | 114 | 10.5 |
| 4 | $(105)_5$ | 72 | 11.5 | 4.2 | 112 | 11.0 |
| 5 | $(93)_3$ | 76 | 10.1 | 3.8 | 120 | 7.1 |
| Comparison Examples | | | | | | |
| 6 | 83 | 57 | 10.0 | 4.0 | 107 | 16.7 |
| 7 | $(102)_3$ | 63 | 10.3 | 3.9 | 109 | 8.5 |
| 8 | $(111)_2$ | 55 | 10.5 | 2.1 | 109 | 7.3 | a index n Impact strength according to DIN 53 453. 10 standard small test bars are tested in each case. Unless all the bars break under a given impact, the impact applied is put in brackets and the number of broken rods indicated after the brackets.
a index k Notched impact strength according to DIN 53 453
Vic. B Heat deflection temperature according to Vicat B (DIN 53 460)
MFI Melt flow index according to DIN 53 735 at 240° C.

We claim:
1. A thermoplastic moulding composition of
(A) from 50 to 80 parts by weight of a graft polymer comprising from 70 to 30% by weight of a mixture of:
  (a) an aromatic vinyl compound and
  (b) acrylonitrile, methacrylonitrile or a mixture thereof; grafted onto 30 to 70% by weight of a rubber having a glass transition temperature of below −10° C. as the graft base; and
(B) from 20 to 95 parts by weight of a terpolymer of
  (c) from 20 to 50 parts by weight of α-methyl styrene or α-methyl styrene mixed in a molar ratio of 1:0 to 1:1 with one or more monomers selected from the group consisting of styrene, acrylic acid alkyl esters, methacrylic acid alkyl esters, acrylic acid cyclohexyl esters, methacrylic acid cyclohexyl esters, acrylic acid phenyl esters, methacrylic acid phenyl esters, acrylic acid benzyl esters, methacrylic acid, acrylic acid amide, methacrylic acid amide, N-alkylacrylamide having 1–8 carbon atoms in the alkyl group, N-alkylmethacrylamide having 1 to 8 carbon atoms in the alkyl group, o-chlorostyrene, m-chlorostyrene, p-chlorostyrene, o-chlorostyrene, p-cyanostyrene, o-methoxy styrene, m-methoxy styrene, p-methoxy styrene, p-isopropyl styrene and 2,5-dimethoxy styrene;
  (d) from 20 to 50 parts by weight p-methyl styrene and
  (e) from 10 to 40 parts by weight acrylonitrile, methaacrylonitrile or a mixture thereof, the sum total of the parts by weight in the (c) to the (e) amounting to 100.

2. A thermoplastic moulding composition as claimed in claim 1, wherein the graft monomers of the graft rubber of component (A) comprise
from 90 to 60% by weight of a monomer selected from the group consisting of styrene, α-methyl styrene, and p-methyl styrene, and
from 10 to 40% by weight of acrylonitrile, methacrylonitrile, or a mixture thereof.

3. A thermoplastic moulding composition according to claim 1 or 2, wherein the graft base of component (A) comprises a butadiene homopolymer or copolymer with 5 to 45% by weight in statistical or segmented distribution of segments selected from the group consisting of polyisoprene, ethylene/propylene copolymer, ethylene/propylene terpolymer, chlorinated polyethylene, ethylene/vinyl acetate copolymer, polypentenamer, ethylene-cyclopentene copolymer, polycyclooctene and homo or copolymers of $C_2$–$C_8$ alkyl acrylate.

4. A thermoplastic moulding composition, as claimed in claim 3, wherein the one or more monomers in compound (a) of the terpolymer (B) are selected from the group consisting of methyl methacrylate, methyl acrylate, maleic acid anhydride, N-alkyl maleic imides, N-cycloalkyl maleic amide, N-aryl maleic imide, acrylamide, methacrylamide, acrylic acid and methacrylic acid.

5. A thermoplastic moulding composition according to any one of claims 1 or 2, wherein the one or more monomers in component (C) of the terpolymer (B) is styrene.

6. Process for making a thermoplastic moulding composition which comprises mass polymerizing in the presence of a catalyst a mixture of
 (a) 20 to 40 parts by weight of α-methyl styrene or α-methyl styrene mixed with at least one monomer selected from the group consisting of styrene, acrylic acid alkyl esters, methacrylic acid alkyl esters, acrylic acid cyclo-hexyl esters, methacrylic acid cyclohexyl esters, acrylic acid phenyl esters, methacrylic acid phenyl esters, acrylic acid benzyl esters, methacrylic acid benzyl esters, acrylic acid, methacrylic acid, acrylic acid amide, methacrylic acid amide, N-alkyl-acrylamide having 1–8 carbon atoms in the alkyl group, N-alkyl-methacrylamide having 1 to 8 carbon atoms in the alkyl group, o-chlorostyrene, m-chlorostyrrene, p-chlorostyrene, o-methoxy styrene, m-methoxy styrene, p-methoxy styrene, p-isopropyl styrene, o-cyanostyrene, p-cyanostyrene, and 2,5-dimethoxy styrene in a molar ratio of 1:0 to 1:1;
 (b) 20 to 50 parts by weight of p-methylstyrene, and
 (c) 10 to 40 parts by weight of acrylonitrile, methacrylonitrile or a mixture thereof;

the sum total of the parts by weight of (a) to (c) amounting to 100, and mixing 20 to 95 parts by weight of the terpolymer produced with 5 to 80 parts by weight of a graft product of from 70 to 30% by weight of a mixture of
 (a) an aromatic vinyl compound; and
 (b) acrylonitrile, methacrylonitrile or a mixture thereof, on 30 to 70% by weight of a rubber having a glass transition temperature of below −10° C. as the graft base.

* * * * *